United States Patent
Ellermann

(10) Patent No.: US 12,465,541 B2
(45) Date of Patent: Nov. 11, 2025

(54) MASSAGE SYSTEM FOR A VEHICLE

(71) Applicant: AUDI AG, Ingolstadt (DE)

(72) Inventor: Lars Ellermann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 405 days.

(21) Appl. No.: 16/708,657

(22) Filed: Dec. 10, 2019

(65) Prior Publication Data

US 2020/0188211 A1 Jun. 18, 2020

(30) Foreign Application Priority Data

Dec. 18, 2018 (DE) .......................... 102018222074.3

(51) Int. Cl.
| | |
|---|---|
| *A61H 1/00* | (2006.01) |
| *B60N 2/90* | (2018.01) |
| *B60Q 3/233* | (2017.01) |
| *B60Q 9/00* | (2006.01) |

(52) U.S. Cl.
CPC ............. *A61H 1/005* (2013.01); *B60N 2/976* (2018.02); *B60Q 3/233* (2017.02); *B60Q 9/00* (2013.01); *A61H 2201/0188* (2013.01); *A61H 2201/1623* (2013.01); *A61H 2201/5064* (2013.01); *A61H 2201/5092* (2013.01); *A61H 2203/0431* (2013.01); *A61H 2230/625* (2013.01)

(58) Field of Classification Search
CPC ............ A61H 1/005; A61H 2201/0188; A61H 2201/1623; A61H 2230/625; A61H 2201/5092; A61H 2201/5064; A61H 2203/0431; A61H 2205/081; A61H 2201/5002; A61H 2201/1645; A61H 2201/5061; A61H 2201/1633; A61H 2201/0149; A61H 23/00; B60N 2/976; B60Q 3/233; B60Q 9/00; B60R 16/037
See application file for complete search history.

(56) References Cited

U.S. PATENT DOCUMENTS

| | | | | |
|---|---|---|---|---|
| 4,655,505 A | * | 4/1987 | Kashiwamura | ........ A47C 7/467 297/284.6 |
| 5,027,795 A | | 7/1991 | Kato | |
| 5,891,064 A | * | 4/1999 | Van Herk | .............. A61H 7/008 601/126 |

(Continued)

FOREIGN PATENT DOCUMENTS

| | | |
|---|---|---|
| CN | 103568903 A | 2/2014 |
| CN | 204766428 U | 11/2015 |

(Continued)

OTHER PUBLICATIONS

German Examination Report issued on Aug. 6, 2019 in corresponding German Application No. 102018222074.3; 12 pages; Machine translation attached.

(Continued)

*Primary Examiner* — Justine R Yu
*Assistant Examiner* — Matthew R Moon
(74) *Attorney, Agent, or Firm* — Maier & Maier, PLLC

(57) ABSTRACT

A massage system for a vehicle seat including at least one massage element, wherein the at least one massage element is arranged in the vehicle seat, wherein at least one massage element of the massage system can be controlled automatically. A method for controlling a massage system in a vehicle, including a massage system as described above.

7 Claims, 1 Drawing Sheet

(56) References Cited

U.S. PATENT DOCUMENTS

| | | | | |
|---|---|---|---|---|
| 2006/0049678 A1* | 3/2006 | Kern | ............... | A47C 7/467 297/284.3 |
| 2009/0099490 A1* | 4/2009 | Durt | ............... | B60N 2/99 297/284.3 |
| 2012/0032478 A1* | 2/2012 | Friderich | ............... | B60N 2/5685 297/180.1 |
| 2012/0226418 A1* | 9/2012 | Veen | ............... | B60N 2/976 297/217.3 |
| 2013/0116852 A1* | 5/2013 | Dijk | ............... | G06F 3/011 700/301 |
| 2019/0216680 A1* | 7/2019 | Lee | ............... | A61H 15/00 |
| 2019/0299830 A1* | 10/2019 | Alequin | ............... | B60N 2/56 |
| 2019/0300020 A1* | 10/2019 | Alexiou | ............... | G06F 3/016 |
| 2019/0308537 A1* | 10/2019 | Steinberger | ............... | B60N 2/914 |
| 2020/0072635 A1* | 3/2020 | Hornstein | ............... | B60N 2/976 |
| 2020/0163824 A1* | 5/2020 | Kim | ............... | A61H 15/0078 |
| 2020/0315910 A1* | 10/2020 | Yamaguchi | ............... | A61H 23/02 |

FOREIGN PATENT DOCUMENTS

| | | | | |
|---|---|---|---|---|
| CN | 106976413 A | 7/2017 | | |
| DE | 102004050233 A1 | 4/2006 | | |
| DE | 102005038289 B3 | 3/2007 | | |
| DE | 102014119658 A1 | 7/2015 | | |
| DE | 102015215171 A1 | 2/2017 | | |
| DE | 102016204845 A1 * | 9/2017 | ......... | A61H 23/0263 |
| DE | 102017008280 A1 | 3/2018 | | |
| DE | 102016224885 A1 | 6/2018 | | |
| DE | 102017009353 A1 | 4/2019 | | |
| WO | WO-03101366 A1 * | 12/2003 | ......... | A61H 23/0263 |

OTHER PUBLICATIONS

Office Action issued on Nov. 11, 2021, in connection with corresponding Chinese Application No. 201911283551.2 (17 pp., including machine-generated English translation).

Office Action issued on May 6, 2022, in connection with corresponding Chinese Application No. 201911283551.2 (19 pp., including machine-generated English translation).

German Office Action issued on Oct. 13, 2022, in corresponding German Application No. 102018222 074.3, 8 pages, (including machine-generated English translation).

* cited by examiner

MASSAGE SYSTEM FOR A VEHICLE

FIELD

The present disclosure relates to a massage system for a vehicle seat including at least one massage element, wherein the at least one massage element is arranged in the vehicle seat. Furthermore, the present disclosure relates to a method for controlling a massage system in a vehicle, including a massage system according to the disclosure.

BACKGROUND

The integration of massage systems into vehicle seats is known in the state of the art. Previous massage systems are designed in a standardised way. It is known that massage systems in vehicle seats can be operated at a variety of speeds, for example.

A vehicle seat and a method for individual adjustment of a seat and/or back rest contour for a seat user are known from the document DE 10 2016 224 885 A1. Here, the vehicle seat comprises volume setting elements which can be selectively pneumatically controlled which serve to perform a massage function and are adjusted depending on the seat user's body shape and height. This is in essence a contour adjustment, which is limited to pneumatic volume setting elements.

A vehicle seat with seat cushion is known from the document DE 10 2004 050 233 A1. The seat cushion has integrated shape-changing elements and sensors for detecting the physiological condition of a driver, wherein the shape-changing elements are adjusted depending on the physiological condition. Lumbar bubbles are individually controlled here.

A method for determining and changing the pressure distribution applied by a human body to a seat or couch arrangement and such a seat or couch arrangement are known from the document DE 10 2005 038 289 B3. The seat or couch arrangement comprises chambers which are filled with a volume of gas, wherein the pressure value exerted on the chambers by the human body is determined and the gas volume in the chambers is adjusted to the pressure value.

SUMMARY

An exemplary objective of the present invention is to provide a massage system in a vehicle which offers improved comfort for a vehicle occupant.

Further advantages and features arise from the general description and the description of the exemplary embodiments.

The object of the present invention is a massage system for a vehicle seat comprising at least one massage element, wherein the at least one massage element is arranged in the vehicle seat.

According to the invention, at least one massage element of the massage system can be controlled automatically. In general, at least one massage element of the massage system can be controlled based on a body shape, a body weight and/or a gender of the vehicle occupant. The ability for the massage system to be automatically controlled based on vehicle occupant-specific values increases the energy efficiency of the massage system and also results in reduced noise.

Here, controllable means that the massage system can be automatically switched on or off depending on a value. Typically, at least one massage element of the massage system can be switched on or off depending on the stature of a vehicle occupant, wherein the massage system is configured to be automatically controllable if the stature of the vehicle occupant changes.

In a development of the invention, the massage system comprises a communication interface which is configured to receive image data from an interior camera and an analysis unit which is configured to determine the stature of a vehicle occupant in the vehicle seat based on the image data received, wherein at least one massage element of the massage system can be controlled depending on the stature of the vehicle occupant in the vehicle seat as detected. In general, an interior camera captures an image of a vehicle occupant sitting in the vehicle seat.

The massage system is configured to analyse the image data received from the interior camera with regard to the stature of the vehicle occupant. In general, the massage system is configured to determine an area on the back rest of the vehicle seat occupied by the vehicle occupant.

In general, the massage elements of the massage system can be controlled independently of one another. For example, it is possible to switch on massage elements which are arranged within the occupied area determined while massage elements which are arranged outside the occupied area remain switched off.

When determining the stature of the vehicle occupant, further parameters such as the seat position/seat elevation of the vehicle seat or body measurement data input via a terminal can be included. In addition to the body weight and gender of the vehicle occupant, the physical size of the vehicle occupant is of primary importance for precise switching on and off.

In a further development of the invention, the massage system is configured to determine the stature of a vehicle occupant depending on the behaviour of at least one massage element under a load, wherein at least one massage element can be controlled depending on the stature determined. A load on the massage element resulting from the stature of a vehicle occupant is possible using a current measurement, for example.

In general, a higher current means a higher load and a lower current means a lower load on the massage element resulting from the stature of the vehicle occupant. This offers the advantage that, in the event of too high a load on the massage element, the massage system is configured to switch off the respective massage element which is under too high a load.

In a further development, the massage system comprises a communication interface which is configured to receive information from at least one sensor integrated into the vehicle seat and an analysis unit which is configured to determine a seat position of the vehicle seat based on the information received from the sensor, wherein at least one massage element of the massage system can be controlled depending on the seat position determined.

In general, the vehicle seat comprises at least one sensor which is configured to determine the seat position/seat elevation of the vehicle seat and communicate it to the massage system. The massage system is configured, during a journey with a driver, to determine the physical size of the vehicle occupant based on the seat position. In general, smaller drivers sit further forward and higher, and larger drivers sit further back and lower.

In a further development, the massage system comprises a terminal, wherein at least one massage element of the massage system can be controlled depending on parameters input via the terminal. A terminal is generally a smartphone, a tablet, a PC or an online portal. The input of parameters via a terminal offers the advantage that no additional sensors are needed for determination of the parameters. A vehicle occupant can thus manually determine parameters in the system for controlling the massage system according to their personal experience as well.

In a further development, at least one massage element of the massage system can be controlled depending on the vibration behaviour determined for the vehicle seat. The massage elements are generally designed as massage and/or vibration elements which have their own vibration behaviour.

In an alternative development, at least one massage element of the massage system can be controlled depending on self-diagnosis of the vibration behaviour of the vehicle seat. For example, the energy requirement, in the form of the current, is measured. If the energy requirement is low, then the element is switched off since there is no counter pressure and thus no occupation by an occupant. If the energy requirement is within the predefined limits, then the element remains active.

In one embodiment, the massage system comprises a detection unit which is configured to determine the vibration behaviour of the vehicle seat. In general, the detection unit is configured to determine a change in resistance of the current for at least one massage element.

In a further embodiment, the massage elements are arranged in the vehicle seat in a curve which matches the human back muscles or linearly. The positioning of the vibration elements in the seat is preferably done along the human back muscles, resulting in a curved shape. The curved arrangement of the massage element in the back rest of the vehicle seat promotes ergonomically correct massage of the back muscles. A linear arrangement of the massage elements in the back rest of the vehicle seat offers the advantage of more cost-effective and space-saving production.

In general, the massage elements are arranged close to the body in the vehicle seat. Typically, the massage elements are arranged under the seat covering of the vehicle seat. For example, a massage element is arranged directly under a leather cover of the vehicle seat. The massage element can also be configured as a vibration element.

In one embodiment, the massage system can be combined with a sound system and/or light system which can be automatically controlled. In general, the massage system can be controlled inversely to the sound system and/or the light system.

The massage system can optionally be configured to be active in an area on the vehicle seat which is occupied by a vehicle occupant, while the sound system and/or light system is active outside the area occupied by the vehicle occupant. The massage system can thus be designed as part of a hybrid system.

Furthermore, the present invention relates to a method for controlling a massage system in a vehicle, comprising a massage system as described above.

In a first step, a stature of a vehicle occupant is determined by the interior camera. Here, the stature is determined using image data from the interior camera. Alternatively, a real-time recording of the stature of the vehicle occupant can be generated by the interior camera.

In a further step, the stature determined is communicated to the massage system's communication interface in the form of image data. In general, the light system determines an area occupied by the vehicle occupant based on the image data communicated.

In a further step, at least one massage element of the massage system is controlled based on the communicated stature of the vehicle occupant. In general, at least one massage element which is arranged in an area occupied by the stature on the vehicle seat is activated here, while at least one massage element which is arranged outside the area occupied by the stature on the vehicle seat is deactivated.

In an alternative embodiment of the method, the massage system is controlled based on information from at least one sensor integrated into the vehicle seat. In general, the massage system determines a seat position of the vehicle seat based on the information from the at least one sensor, wherein at least one massage element of the massage system is controlled depending on the seat position determined.

In a further alternative embodiment of the method, at least one massage element of the massage system is controlled depending on parameters input via the terminal. This offers the advantage that the massage system can be actively controlled through the vehicle occupant's input.

BRIEF DESCRIPTION OF THE DRAWINGS

Below, preferred exemplary embodiments of the invention are illustrated in more detail by way of very simplified schematic representations. In the drawings.

DETAILED DESCRIPTION

In the figures, the same reference numbers indicate the same construction elements.

Figure 1:
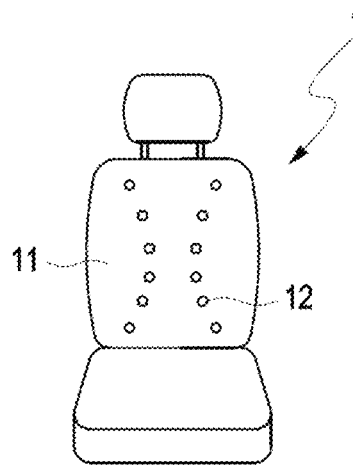
FIG. 1 A schematic arrangement of an embodiment of a massage system according to the invention in a vehicle seat, FIG. 2 A schematic arrangement of a further embodiment of the massage system according to the invention in a vehicle seat, FIG. 3 Arrangement of a massage element of the massage system according to the invention in the interior of a back rest of the vehicle seat, FIG. 4 A schematic arrangement of the massage system according to the invention.

FIG. 1 shows a schematic view of a massage system 10 according to the invention in a vehicle seat 11. The massage system 10 according to the invention comprises at least one massage element 12.

In the embodiment of the massage system 10 according to the invention shown, two rows of massage elements 12 are arranged in a back rest of the vehicle seat 11. Here, the rows of massage elements 12 are arranged in a curve. This matches the shape of the human back muscles and contributes to a massage experience which is beneficially adapted to the anatomy of the vehicle occupant.

Figure 2:
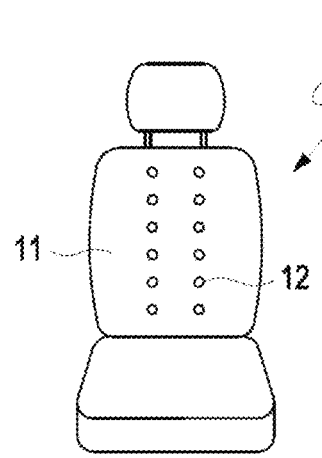

FIG. 2 shows a schematic view of the massage system 10 according to the invention in the vehicle 11. The embodiment of the massage system according to the invention shown likewise has two rows of massage elements 12 which are arranged in the back rest of the vehicle seat 11. Here, the two rows of massage elements 12 are arranged linearly and in parallel with one another. The linear arrangement of the massage elements 12 in the back rest of the vehicle seat 11 offers easier and more cost-efficient installation of the massage system 10 in a vehicle.

Figure 3:
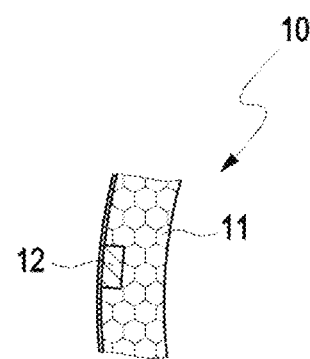

FIG. 3 shows the arrangement of a massage element 12 of the massage system 10 according to the invention in the interior of the back rest of the vehicle seat 11. Here, the arrangement of a massage element 12 is generally done close to the vehicle occupant's body. Here, a respective massage element 12 is arranged directly under a cover of the vehicle seat 11. An intermediate layer between the massage element 12 and the cover of the vehicle seat can be used to prevent the massage elements 12 from causing sink marks or irregularities in the surface of the vehicle seat. The massage elements 12 may also be designed as vibration elements.

Figure 4:
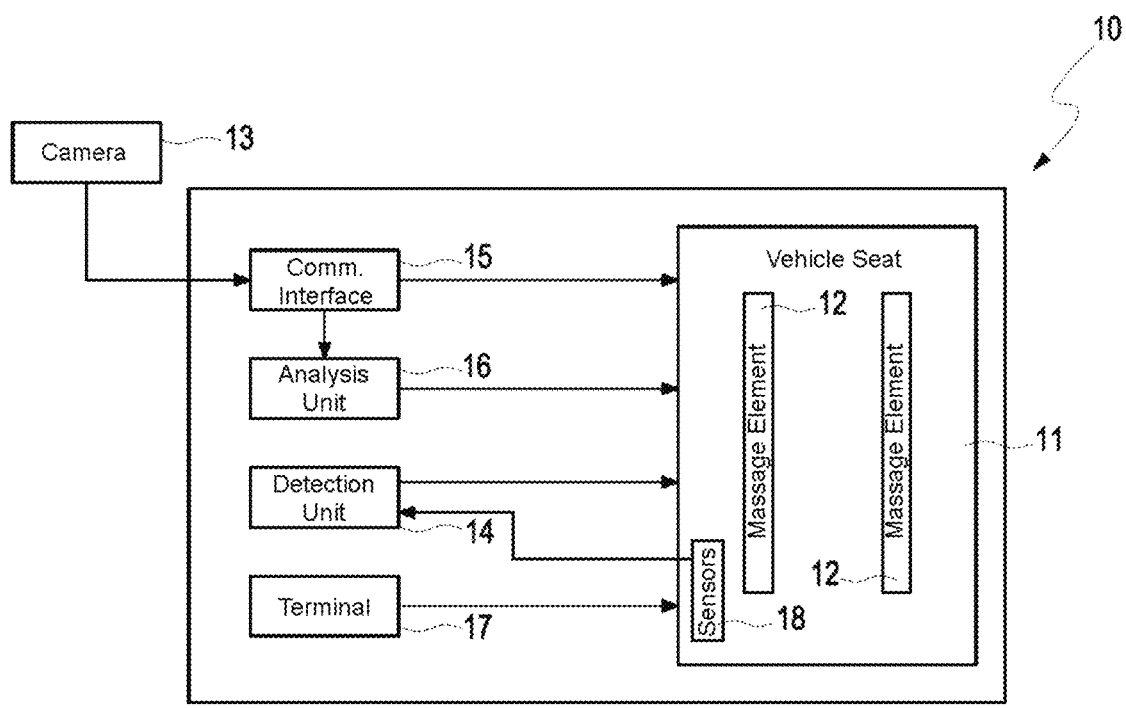

FIG. 4 shows a schematic arrangement of the massage system 10 according to the invention. The vehicle seat 11 is shown schematically here, wherein two rows of massage elements 12 are arranged in the vehicle seat 11. The rows each comprise at least two massage elements 12.

At least one sensor 18 is shown schematically in the vehicle seat 11. Multiple sensors 18 may be arranged in the vehicle seat 11 in the back rest area of the vehicle seat 11 or in a seat area of the vehicle seat 11. The massage system 10 comprises a communication interface 15 which is configured to receive image data from an interior camera 13.

The massage system 10 also comprises a detection unit 14 which is configured to determine the vibration behaviour of the vehicle seat 11. The massage elements 12 of the massage system 10 can be controlled based on the vibration behaviour.

The massage system 10 also comprises an analysis unit 16 which is configured to determine the stature of a vehicle occupant in the vehicle seat based on the image data received.

At least one massage element 12 of the massage system 10 can be controlled based on the stature of the vehicle occupant determined.

The massage system 10 can determine an area on the back rest of the vehicle seat occupied by the vehicle occupant.

Further parameters such as the seat position/seat elevation of the vehicle seat 11 or body measurement data input via a terminal 17 can be included for controlling the massage system 10.

Likewise, the body weight and gender of the vehicle occupant can be taken into account for control, wherein the physical size of the vehicle occupant is of primary importance.

The invention claims is:

1. A massage system for a vehicle seat comprising:
   a plurality of massage elements which are controlled automatically and are arranged in a curve down a backrest of the vehicle seat such that, reflected across a centerline of the backrest, massage elements arranged near a middle of the backrest are closer to one another than massage elements arranged near a top and a bottom of the backrest;
   a communication interface configured to receive image data from an interior camera and sensor data from at least one sensor integrated into the vehicle seat;
   a terminal for receiving input parameters which control the massage system;
   an analysis unit configured to determine a stature of a vehicle occupant in the vehicle seat based on the received image data and seat position and/or elevation information input by a user at the terminal; and
   a detection unit configured to determine a vibration behavior of the vehicle seat,
   wherein the received sensor data describes at least one of a position and an elevation of the vehicle seat,
   wherein the plurality of massage elements are controlled based on (1) the stature of the vehicle occupant, (2) the received sensor data, and (3) a measured electrical current which is proportional to a load on each of the plurality of massage elements, and
   wherein one or more of the plurality of massage elements are switched off when the measured electrical current exceeds a first load threshold and when the measured electrical current falls below a second load threshold.

2. The massage system according to claim 1, wherein the stature of the vehicle occupant is further determined based on a behavior of one or more of the plurality of massage elements under the load.

3. The massage system according to claim 1, wherein one or more of the plurality of massage elements of the massage system are further controlled based on the vibration behavior of the vehicle seat.

4. The massage system according to claim 1, wherein control of the massage system is integrated with a sound and/or light system.

5. A method for controlling a massage system of a vehicle seat, the massage system comprising a plurality of massage elements which are controlled automatically and are arranged in a curve down a backrest of the vehicle seat such that, reflected across a centerline of the backrest, massage elements arranged near a middle of the backrest are closer to one another than massage elements arranged near a top and a bottom of the backrest, the method comprising:
   observing a vehicle occupant using an interior camera;
   receiving input parameters from a user via a terminal which controls the massage system;
   measuring at least one of a position and an elevation of the vehicle seat using at least one sensor integrated into the vehicle seat;
   communicating to a communication interface of the massage system image data from the interior camera and sensor data from the at least one sensor;
   detecting a vibration behavior of the vehicle seat;
   determining a stature of the vehicle occupant based on the image data and seat position and/or elevation information input by the user at the terminal; and
   controlling the plurality of massage elements based on (1) the stature of the vehicle occupant, (2) the sensor data, and (3) a measured electrical current which is proportional to a load on each of the plurality of massage elements,
   wherein one or more of the plurality of massage elements are switched off when the measured electrical current exceeds a first load threshold and when the measured electrical current falls below a second load threshold.

6. The massage system according to claim 1, wherein the terminal is configured to receive body measurement data input by the user.

7. The massage system according to claim 1, wherein the terminal comprises at least one of a smartphone, a tablet, a PC, or an online portal.

* * * * *